United States Patent
Gohlke et al.

(10) Patent No.: US 11,260,877 B2
(45) Date of Patent: Mar. 1, 2022

(54) METHOD FOR SELECTING A DRIVING PROFILE OF A MOTOR VEHICLE, DRIVER ASSISTANCE SYSTEM AND MOTOR VEHICLE

(71) Applicant: Volkswagen Aktiengesellschaft, Wolfsburg (DE)

(72) Inventors: Julia Gohlke, Wasbüttel (DE); Paul Hochrein, Berlin Spandau (DE); Holger Spahr, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/969,135

(22) PCT Filed: Jan. 22, 2019

(86) PCT No.: PCT/EP2019/051416
§ 371 (c)(1),
(2) Date: Aug. 11, 2020

(87) PCT Pub. No.: WO2019/154615
PCT Pub. Date: Aug. 15, 2019

(65) Prior Publication Data
US 2021/0039663 A1    Feb. 11, 2021

(30) Foreign Application Priority Data
Feb. 12, 2018   (DE) .................... 10 2018 202 146.5

(51) Int. Cl.
*B60W 50/08*    (2020.01)
*B60W 50/00*    (2006.01)
(Continued)

(52) U.S. Cl.
CPC ...... *B60W 50/082* (2013.01); *B60W 50/0098* (2013.01); *B60W 50/085* (2013.01);
(Continued)

(58) Field of Classification Search
CPC ........... B60W 50/082; B60W 50/0098; B60W 50/085; B60W 50/10; B60W 2050/0075;
(Continued)

(56) References Cited

U.S. PATENT DOCUMENTS

| 9,248,819 B1* | 2/2016 | Tan .......................... B60T 17/18 |
| 2010/0023223 A1 | 1/2010 | Huang et al. ................... 701/44 |

(Continued)

FOREIGN PATENT DOCUMENTS

| DE | 102014215258 A1 | 2/2016 | ............ B60W 40/08 |
| DE | 102015007242 A1 | 12/2016 | ............. B60R 16/02 |

(Continued)

OTHER PUBLICATIONS

International Search Report and Written Opinion, Application No. PCT/EP2019/051416, 21 pages, dated Mar. 18, 2019.

(Continued)

*Primary Examiner* — Maceeh Anwari
(74) *Attorney, Agent, or Firm* — Slayden Grubert Beard PLLC

(57) ABSTRACT

A method for selecting a driving profile of a motor vehicle, a driver assistance system therefor and a motor vehicle equipped therewith is disclosed. In the method and based on an operating action by a driver, a deviation between the number of predetermined driving profiles currently desired by the driver and that previously used is recognized. After the deviation has been recognized, a query is output to the driver as to whether the deviation should be taught by the driver assistance system for the current situation. After the query has been confirmed by the driver, the driver assistance (Continued)

system is accordingly adapted for the current situation in at least one parameter influencing the selection of the driving profile to be used such that the deviation in the automatic selection of the driving profile to be used in future situations that corresponds to the current situation is taken into account.

19 Claims, 2 Drawing Sheets

(51) Int. Cl.
    *B60W 50/10*     (2012.01)
    *G06N 3/04*     (2006.01)

(52) U.S. Cl.
    CPC ............. *B60W 50/10* (2013.01); *G06N 3/04* (2013.01); *B60W 2050/0067* (2013.01); *B60W 2050/0075* (2013.01); *B60W 2540/043* (2020.02); *B60W 2540/215* (2020.02); *B60W 2556/10* (2020.02)

(58) Field of Classification Search
    CPC ....... B60W 2556/10; B60W 2540/215; B60W 2540/043; B60W 2050/0067; B60W 2050/009; B60W 2540/30; B60W 2710/182; B60W 2710/22; B60W 2556/55; G06N 3/04

USPC ........................................................ 701/23
See application file for complete search history.

(56) References Cited

U.S. PATENT DOCUMENTS

| | | |
|---|---|---|
| 2015/0235485 A1 | 8/2015 | Nemat-Nasser et al. ......... 701/1 |
| 2017/0080948 A1 | 3/2017 | Lubbers et al. ................ 701/36 |
| 2019/0016344 A1 | 1/2019 | Ehmann |

FOREIGN PATENT DOCUMENTS

| | | | | |
|---|---|---|---|---|
| DE | 102017211931 A1 | 1/2019 | ............ | B60W 40/08 |
| DE | 102018202146 B4 | 8/2019 | ............ | B60W 40/08 |
| EP | 2886410 A1 | 6/2015 | ............ | B60W 30/14 |
| TL | 2019/154615 A1 | 8/2019 | ............ | B60W 50/00 |
| WO | 2016/109540 A1 | 7/2016 | ............ | B60W 30/09 |

OTHER PUBLICATIONS

German Office Action, Application No. 102018202146.5, 4 pages, dated Mar. 28, 2019.

\* cited by examiner

METHOD FOR SELECTING A DRIVING PROFILE OF A MOTOR VEHICLE, DRIVER ASSISTANCE SYSTEM AND MOTOR VEHICLE

CROSS-REFERENCE TO RELATED APPLICATIONS

This application claims priority to German Patent Application No. DE 10 2018 202 146.5, filed on Feb. 12, 2018 with the German Patent and Trademark Office. The contents of the aforesaid Patent Application are incorporated herein for all purposes.

TECHNICAL FIELD

The invention relates to a method for selecting a driving profile of a motor vehicle or for a motor vehicle, a corresponding driver assistance system and a motor vehicle equipped with such a driver assistance system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Basically, it is known to provide different driving profiles or driving modes in or for motor vehicles. A driving profile in this sense is or comprises a set of parameters, parameter values, settings and/or specifications which influence or determine an operating behavior of the motor vehicle as a whole or of parts of the motor vehicle. By selecting a specific driving profile, for example, a stiffness or tuning of a chassis or of a damping device of the motor vehicle, its acceleration, braking, response and/or steering behavior, fuel or energy consumption and/or the like can be influenced or set directly or indirectly. Typical predefined driving profiles, for example defined or determined by a manufacturer, are known, for example, under the names Comfort, Eco, Sport or the like.

DE 10 2014 215 258 A1 discloses a method and a device for automatically selecting driving modes. Within this, a specific driver or a specific driver type is determined, for whom a driving profile is then loaded which is designed to influence the driving mode. A driving mode is then selected in consideration of the driver profile and driving information. The individual driving modes are firmly defined and cannot be changed by the driver.

A system for controlling a vehicle is also known from US 2017/0 080 948 A1. A movement of the vehicle is determined based on sensor data. Based on the movement of the vehicle, characteristics of a traffic surface or a driving behavior of a user of the vehicle are determined. Based on this, a driving mode of the motor vehicle is then determined, which is used by means of an appropriately configured actuator. The driving mode can be set automatically without monitoring by the user.

In such methods, a specific set of rules for selecting the driving profile or driving mode is usually specified. Accordingly, such systems often behave in the same way for different users, i.e. drivers of the respective vehicle. Alternatively, from series vehicle construction a manual selection of a specific driving profile or driving mode by the respective driver is known. However, such a manual selection or switching of the driving profile can disadvantageously result in reduced comfort, an additional burden or distraction for the driver.

SUMMARY

An object exists to enable an individualized automatic driving profile selection.

This object is solved by the subject matter of the independent claims. Embodiments of the present invention are discussed in the dependent claims, in the description, and in the drawings.

DETAILED DESCRIPTION

Figure 1:
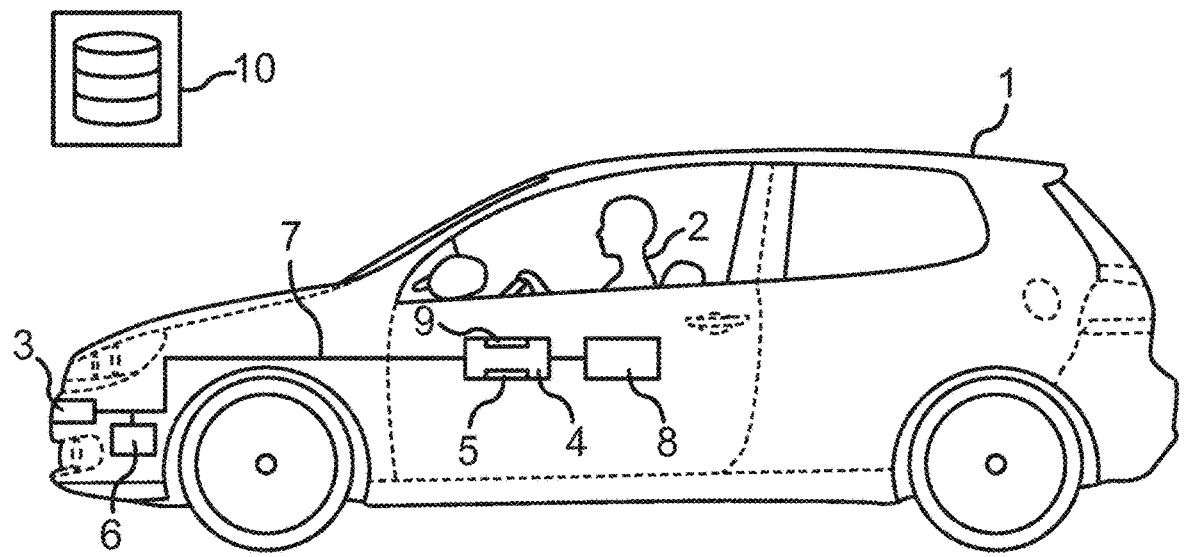
FIG. 1 shows an embodiment of a schematic sectional side view of a motor vehicle with a driver assistance system for selecting a driving profile to be used.

In a first exemplary aspect, a method for selecting of a motor vehicle's driving profile to be used is provided. Herein, the driving profile currently to be used is automatically selected from a plurality of predefined driving profiles by means of a driving assistance system of the motor vehicle. The multiple predefined driving profiles each determine at least one operating characteristic or one operating behavior of the motor vehicle. The predefined driving profiles may for example comprise or represent a set of several values or settings for operating parameters and/or functional devices of the motor vehicle.

According to the present aspect, in the method, the driver assistance system automatically recognizes a deviation between the driving profile currently desired by the driver and the driving profile of the several predetermined driving profiles that previously has been used by the driver of the motor vehicle on the basis of at least one operator action taken by the driver of the motor vehicle. After the deviation has been recognized, a query is output to the driver as to whether the deviation should be taught/learned by the driver assistance system for the current situation or type of situation. After confirmation of the query, the driver assistance system is adapted for the current situation or type of situation in accordance with the driving profile currently desired by the driver in at least one parameter influencing the selection of the driving profile, such that the deviation in the automatic selection of the driving profile to be used in future situations corresponding to the current situation is taken into account.

In other words, the current situation is automatically recognized, identified or determined and the driver assistance system, such as a selection mechanism or selection method of the driver assistance system for selecting the driver profile to be used in each case, is adapted as a function of the operating action, that is to say a behavior of the driver. By adapting the driver assistance system, an individualization of the selection of the driving profile to be used can thus be realized for the respective driver. The future automatic selection of the driving profile to be used is then carried out by the correspondingly adapted or individualized driver assistance system.

In the present case, an iterative, learning method and driver assistance system is therefore provided. Over time, the driver assistance system adapts to individual behaviors or preferences of the driver, such that driving profiles that depending on the situation automatically have been selected by the driver assistance system can then precisely map or anticipate a request of the respective driver. The present aspect beneficially not only offers the driver an improved driving experience or user experience of the motor vehicle, but the driver may also be relieved of measures which are demanding and possibly distracting, such as manual adjustment or switching of the driving profile used or to be used.

In practice, it often happens that drivers neglect to manually select or switch the driving profile, especially if the situation, for which a driving profile other than the one previously used is more suitable, is only relatively short in terms of time and/or space. A relatively short situation in this sense may be or include, for example, a single driving maneuver, such as an overtaking maneuver, driving through a traffic-calmed area of for example less than 1 km in length and/or within less than two minutes, or the like. Therefore, by automatic selection of the driving profile to be used, beneficially a potential of the motor vehicle may be utilized better when needed, and on average, fuel or energy consumption of the motor vehicle may be reduced and at the same time frustrating the driver can be avoided. As a result of the acceptance of the automatic driving profile selection and automatic driving profile switching promoted in this way, the entire spectrum of the predetermined driving profiles advantageously is used or used more appropriately for the situation and at the same time adapted to the respective driver.

The method according to the present aspect may be provided as a selectable operating mode of the driver assistance system. This operating mode, which may also be referred to as an adaptive driving profile, may be made available to the driver as an alternative to a manual, fixed selection or specification of one of the other predetermined driving profiles. In this operating mode, when the adaptive driving profile is selected or used, it is therefore possible to automatically select and switch between the other predetermined driving profiles according to the current situation.

In the sense of the present aspect, the current situation may be determined or characterized both by a state of the motor vehicle and by an environment of the motor vehicle. The state of the motor vehicle may be determined or described by vehicle data or vehicle signals. To detect or determine the current situation, these data or signals may be made available to the driver assistance system via a bus or a bus system, for example a CAN bus of the motor vehicle, by means of a signal transmitter and/or the like. The vehicle data relating to the state of the motor vehicle may, for example, be or include a pedal position, a steering angle, a lateral and/or longitudinal acceleration, an operating state and/or parameter value of one or more other assistance systems of the motor vehicle, commands or control signals from one or more control units of the motor vehicle and/or the like. Ambient data relating to the surroundings of the motor vehicle, which are used to characterize the current situation, may, for example, comprise or describe a type or class of a road currently being driven, its condition or quality, weather conditions, a time of day, visibility conditions, a permissible maximum speed valid for a section of road currently being driven, a distance of the motor vehicle to one or more other road users and/or obstacles in the vicinity of the motor vehicle, a traffic density on a route section traveled by the motor vehicle and/or the like.

In addition, the current situation may also be described or characterized by driver information. The driver information may include or describe properties or a state of the driver, for example a determined ability to react, a state of alertness or fatigue, a type of driver characterizing an average driving behavior of the driver, the use of a visual aid or sunglasses and/or the like.

In summary, the current situation may be described or determined by situation data, which may include some or all the aforementioned data, types of data or signals. A future situation may be characterized or determined as corresponding to the current situation if the situation data describing the future situation, which is then valid, matches the situation data describing the current situation at least in a predetermined part or to a predetermined proportion or at most have a predetermined distance or difference to the situation data of the current situation. Several corresponding parameters and/or a selection of certain corresponding parameters of the situation data or their values may be predefined, which must correspond to one another concerning the future situation and the current situation. For example, it may be stipulated that a future situation may only be assessed or classified as corresponding to the current situation if the same driving maneuver is carried out in both situations and/or if a road of the same type or class is used and/or if the speed of the motor vehicle in both situations is within the same of several predetermined intervals. Further parameters, such as a time of day, for example may be compared with one another for both situations in order to determine a probability or confidence that the two situations correspond to one another. Accordingly, as a part of the present aspect, the probability and/or confidence that the two situations correspond may be determined automatically. For this, a threshold value may be specified, so that the two situations are only assessed or classified as corresponding to one another if the probability or confidence corresponds at least to the specified threshold value.

In the sense of the present aspect, the driving profile previously used until recognition of the deviation means the driving profile which is active immediately before or when the deviation is recognized, that is to say was last selected and is used at the time the deviation is recognized. The driving profile to be used means the driving profile which, taking into account the driver's request, according to the rules is best suited to all of the given driving profiles, i.e., according to the selection mechanism of the driver assistance system, at the time of the detection of the deviation or immediately after, that in the best manner fulfills the situation-dependent requirements, that are then applicable. The driving profile to be used thus corresponds, at least ideally, to the driving profiles actually desired by the driver in the respective situation. After selecting the driving profile to be used, it may be activated in particular as part of the method according to the present aspect, that is to say it may actually be used for the current situation. Switching from the driving profile previously used to the selected driving profile to be used may thus be part of the method according to the present aspect.

A deviation between the driving profile currently desired by the driver and the driving profile previously used means that the driving profile desired by the driver is different from the driving profile previously used, that is to say the driver desires a different driving profile than the one previously used. In other words, the deviation is given if at or from the time the deviation is detected, i.e., for example for a current maneuver or the current situation, a different one of the predefined driving profiles than the driving profile previously used is the one which better complies with the requirements on the motor vehicle with regard to the respective maneuver or to the current situation than the driving profile previously used. If the maneuver or the situation is, for example, an overtaking maneuver, a driving profile that provides maximum responsiveness or acceleration capacity of the motor vehicle is more suitable, i.e., fulfills the requirements better, than another driving profile that, for example, has a lower acceleration capacity and provides reduced fuel or energy consumption.

Different operating parameters of the motor vehicle, which are set or influenced by the driving profiles, may be provided with a predetermined prioritization or weighting, which indicates their relevance or importance for different driving maneuvers or situations. A driving profile may then be classified as better fulfilling the respective requirements if the parameter values of the operating parameters of the motor vehicle provided are closer to or correspond to the optimal parameter values for the respective maneuver or situation in accordance with the predetermined weighting or prioritization.

To teach the detected deviation for the respective situation, the situation data and the driving profile desired by the driver, that is to say the driving profile to be used, may be provided as input data to the driver assistance system, in particular to an adaptation module or to a learning module of the driver assistance system. This can then process this input data in such a way that it selects the driving profile, which is desired by the driver, i.e., the driving profile to be used, in situations which correspond to the current situation, with a higher probability, more heavily weighted and/or automatically, by adapting the at least one parameter of the driver assistance system that influences the selection of the driving profile to be used, in particular its selection mechanism, that is to say the adaptation or learning module. In particular, a method of machine learning, such as for example a neural network, can be used for teaching.

The query may be output to the driver via a user interface of the driver assistance system or the motor vehicle. The query may be displayed, for example, acoustically or optically, in particular graphically, symbol-based or as text, for example on a screen. For example, an on-board computer or an infotainment system of the motor vehicle, in particular with a key or control panel, a touchscreen or touchpad or the like, may be used for this purpose. The driver's confirmation of the query may be given via the same or a different user interface and be received by the driver assistance system. The driver may give the confirmation, for example, as a voice command, by pressing a button or by touching the touchscreen.

The query and its confirmation may initially burden the driver, however, it is beneficially achieved by means of the present aspect that deviations between the driving profile desired by the driver and the driving profile actually used occur less frequently, due to the teaching, i.e., the adaptation of the driver assistance system over time, that is to say with increasing use of the driver assistance system by the driver, since the driver assistance system adapts to the driver, meaning it learns the driver's wishes or preferences. It is a benefit that this adaptation or learning can take place particularly effectively by querying, i.e., collecting feedback from the driver. For example, special or one-time occurring situations, in which indeed there may be a deviation, the corresponding query however is not confirmed by the driver, beneficially do not lead to a change or influence, that is to say to an adaptation of the driver assistance system or its selection mechanism. Thus, a faster convergence of the selection mechanism of the driver assistance system to the behavior of the driver assistance system desired by the driver can occur. In addition, the driver is beneficially offered a possibility of specifically influencing the behavior of the driver assistance system. At the same time, it is avoided that the driver may react hesitantly in critical situations out of the fear of influencing the driver assistance system in an undesired manner, which could happen without the mechanism of query and confirmation. For example, the driver may generally wish to use a fuel-saving (ECO) or particularly comfortable (Comfort) driving profile when driving through a traffic-calmed area. If the driver then drives, for example due to an unforeseen deadline pressure, in a traffic-calmed area with a particularly aggressive, i.e., sporty driving style or even selects a predetermined sporty driving profile manually, he can deny or reject the resulting query of the driver assistance system, i.e., may not confirm it, and thereby avoid that the driver assistance system in future learns to switch or to change to a sporty or aggressive driving profile with high driving dynamics (Sport) in the traffic-calmed area.

There are various ways of recognizing the deviation. In some embodiments, a manual selection of one of the several driving profiles is evaluated as the operating action performed by the driver. If the driver selects or activates a different one of the predefined driving profiles than the driving profile previously used for the current driving maneuver or in the current situation himself, this can be interpreted as the driver's request that for this driving maneuver or for this situation or future situations corresponding to this situation he wishes, i.e., prefers, the use of the driving profile manually selected by him. The evaluation of such a driver's manual selection of a driving profile is especially beneficial since there is no uncertainty about the driving profile desired by the driver, i.e., that uncertainty can be avoided. A particularly precise and reliable adaptation of the driver assistance system to the driver or his preferences can therefore be realized.

In some embodiments, a driving maneuver performed by the driver is automatically recognized and evaluated as the operating action performed by the driver on the basis of current values of predetermined parameters. In other words, the operating action in this case is to be equated with operating or driving the motor vehicle to perform the respective driving maneuver. The operating action may include several operations or operating processes, that is to say single or partial actions, as well as continuous actions or processes. For example, the operating action in this sense may include actuating, for example fully pressing or depressing, an accelerator pedal. Likewise, the operating action may include, for example, actuating a direction indicator of the motor vehicle, as a turn signal, and changing the steering angle. From this, the driving maneuver may already be recognized as a lane change or as an overtaking process, wherein for example further situation data for recognizing the driving maneuver may be considered, i.e., be evaluated. For example, data from an assistance system of the motor vehicle for lane detection as well as position data from other road users in the vicinity of the motor vehicle may be used, i.e., be considered and be evaluated. For example, if a particularly fuel-saving driving profile (ECO) was selected up to that point, i.e., was active, then it may be recognized as a deviation that the driver actually wants a sporty driving profile with an increased acceleration capacity or faster response behavior of the motor vehicle. In this example, this is justified, e.g., by the fact that the full depression of the accelerator pedal (kickdown) is not compatible with a minimal fuel consumption and that based on higher prioritized safety considerations the driving maneuver, i.e., the overtaking process, execution and completion as quickly as possible is more desired by the driver as a minimal fuel consumption, at least with a higher probability, because otherwise the driver would not have initiated the overtaking process, for example. In this case, the ECO driving profile may therefore meet the requirements of the current driving maneuver or the current situation, i.e., the overtaking maneuver, less well than the sport driving profile.

In further embodiments, the driver assistance system for the situation-dependent selection of one of the several driving profiles comprises a basic module based on predetermined rules as a fallback mechanism and a learning module for adapting the driver assistance system. Specified types of data or data signals received via a vehicle bus system of the motor vehicle are processed by a predefined control matrix by the basic module in order to select the driving profile. The learning module, on the other hand, processes the operating action and situation data characterizing a respective current driving situation—in particular the situation data already mentioned—by means of a machine learning method, such as, e.g., by means of at least one neural network. This two-part construction of the driver assistance system can beneficially ensure that the driver assistance system can always fulfill its basic functionality of selecting a suitable driving profile, depending on the situation, regardless of the driver actively using the driver assistance system. At the same time, machine learning, in particular through the neural network, may also reliably detect complex driving maneuvers and situations, since it is comparatively simple to process a large number, possibly also different, of data, data types or data signals, for example a suitably trained neural network.

In contrast, a neural network, for example, can more easily process and recognize even complex combinations of data signals. This makes it possible to recognize or evaluate driving maneuvers, situations and/or a behavior or a desire of the driver more accurately and reliably. This way it can be achieved that the automatically selected driving profile fits the respective situation even better. Another benefit of the two-part construction of the driver assistance system is that the driver assistance system can be reset to a delivery state, whereby adjustments to the driver assistance system that have been learned over time can be discarded. The given control matrix then enables the driver assistance system to continue to perform its task and the behavior can be readjusted over time by re-teaching and adapting the driver assistance system, for example to a new driver of the motor vehicle.

In the present embodiments, the basic module and the learning module may for example also be used individually or independently of one another. Instead of both modules, only the basic module or only the learning module may also be provided.

In other embodiments, a current driving maneuver is automatically recognized by evaluating situation data characterizing a respective current driving situation—in particular the situation data already mentioned. In the case of a plurality of driving maneuvers which are recognized at the same time and to which one of the driving profiles is predetermined, that is to say in a predetermined manner, the driver assistance system selects the driving profiles to be used depending on or according to a predetermined prioritization of the driving maneuvers. In other words, an assignment between driving maneuvers and driving profiles is provided, so that after the detection of a certain driving maneuver, the driving profile associated with this driving maneuver may be determined as the driving profile to be used, particularly quickly and with little effort. In a complex situation, however, several different driving maneuvers, to which different driving profiles may be assigned, can overlap completely or partially. In such a case, the one of the driving profiles assigned to the recognized driving maneuvers which has the highest priority or prioritization is selected. For example, the comfort driving profile may be assigned to driving on a country road, while the sport driving profile may be assigned to an overtaking maneuver.

If an overtaking maneuver were carried out on a country road, there would be a conflict since both the condition for selecting the comfort driving profile and the operation for selecting the sport driving profile are met. To solve this conflict, a higher prioritization or priority can be assigned to the sport driving profile than the comfort driving profile in this example, so that the sport driving profile would then be selected for the overtaking maneuver.

In other embodiments, the driver assistance system determines a profile candidate for the driving profile to be used based on several different data sources. The driver assistance system then selects the driving profile to be used from these multiple profile candidates depending on a predetermined prioritization of the driving profiles. The several different data sources in particular may be devices of the motor vehicle which provide different parts of the situation data. In such a case, for example, evaluating environmental data, i.e., data provided by an environmental sensor system of the motor vehicle as a first data source, could lead to the determination of a first profile candidate. The evaluation of vehicle data, for example relating to a state of the motor vehicle and provided by a second data source, may lead to the determination of another, second profile candidate. For example, the sport driving profile could be determined as the first profile candidate and the energy-saving ECO driving profile as the second profile candidate. If, for example, the ECO driving profile then has a higher priority or prioritization than the sport driving profile, the second of the two profile candidates would then be selected as the driving profile actually to be used. This may be particularly beneficial, for example, in a situation in which external conditions make the sport driving profile appear to be the most suitable for the respective situation, while according to the vehicle data, for example a state of charge of a traction battery in the motor vehicle, the ECO driving profile appears most suitable. For example, the ECO driving profile can have a higher priority than the sport driving profile if it is determined on the basis of the current state of charge, in particular taking into account a current position and/or a current navigation destination of the motor vehicle, that when the sport driving profile is used, reaching of the navigation destination cannot be guaranteed.

In particular, the prioritization of the driving profiles may therefore be automatically dynamical adjusted as a function of the situation data. Driver information can also be considered, for example. For example, a prioritization of the sport driving profile can be dynamically adjusted depending on the driver's state, in particular its attentiveness and/or fatigue, so that the prioritization of the sport driving profile is reduced with decreasing attentiveness, that is to say with increasing possibility of the driver. In this case, for example, safety may be increased when driving the motor vehicle.

In some embodiments, the query is only output to the driver when a same deviation has been recognized in several situations corresponding to the current situation. In other words, the query is only output to the driver when he has repeatedly indicated through his operating actions in corresponding situations that he desires a different driving profile than the one previously used, in particular in these situations the same driving profile. As a result, several queries issued to the driver and thus his burden can beneficially be reduced. At the same time, it may be achieved that even without explicitly denying or rejecting an inquiry, individual or special situations, i.e., exceptional cases or exceptional situations, are not taught to adapt the driver assistance system. Thus, since only recurring behaviors or wishes of the driver, which are also constant or consistent across several situations, are learned, the driver assistance system may be adapted to the respective driver in a particularly precise, reliable and robust manner. The driver assistance system may have a corresponding buffer for this functionality.

In some embodiments, an associated spatial position of the motor vehicle at which the deviation occurred is automatically recorded as part of the current situation. Upon the first confirmation of the query in this situation, the driver assistance system is initially only adapted for the individually recorded position. In other words, the adaptation then only applies to situations corresponding to the current situation that occur at the currently detected position. Only when the deviation has been recognized several times at different spatial positions for situations corresponding to this situation and when the corresponding respective queries have been confirmed, the driver assistance system will be adjusted in a position-independent manner for all future similar situations, that is to say corresponding to the respective situation. In other words, it is taken into account whether the driver only wants the driving profile desired in the current situation at a certain spatial location, for example on a single section of road, or generalizes in all corresponding situations also at different spatial positions, also if the motor vehicle is moving on a different section of the route. This way, improved individualization and greater flexibility of the driver assistance system and its adaptation to the driver may be achieved. For example, the driver may prefer a sporty driving profile for a single curve, for example on a country road, but generally wants to use the ECO or comfort driving profile for other curves on country roads. This improved individualized granularity when the driver assistance system automatically selects the driving profile to be used is therefore of benefit.

In some embodiments, the driver assistance system automatically determines a driver type of the driver and assigns this specific driver type to this driver. From the plurality of predefined driving profiles, the driver assistance system then automatically determines at least one driving profile that does not match the specific driver type and prevents or limits the automatic selection of the specific driving profile that does not match the driver type. In other words, a difference between a driving behavior of the motor vehicle resulting from the use of the respective driving profile and a driving behavior of the driver assigned or corresponding to the specific driver type can thus be determined for each of the predetermined driving profiles. A driving profile may be classified as not suitable for this driver type if this difference exceeds a predetermined threshold value. Likewise, the driving profile for which the greatest deviation of all the given driving profiles has been determined can be classified as not suitable for a specific driver type. Possible driver types are, for example, a sporty-aggressive driver type, a careful or defensive driver type, an environmentally conscious or fuel-saving, i.e., economical driver type, or the like. If, for example, the sporty-aggressive driver type is determined for the driver, then a probability or frequency can be reduced with which, for example, the ECO driving profile, which saves fuel and reduces driving dynamics, is automatically selected. Prioritization of the driving profile that is determined not to be suitable for the driver type may also be reduced, for example. As a result, the behavior of the driver assistance system may beneficially be adapted to the driver in a further improved manner, being individualized.

In some embodiments, as a part of the query or after the query has been confirmed, the driver assistance system outputs a profile suggestion automatically determined by the driver assistance system for the driver profile to be used in the current situation or corresponding future situations. Only after the profile proposal has been confirmed the driver assistance system will be adjusted so that in future situations corresponding to the current profile, the one or more driving profiles corresponding to the confirmed profile proposal will be selected automatically. In other words, in such a case the driver assistance system is not adapted in a way that is recognizable to the driver, but the driver is informed about which driver profile the driver assistance system has determined or selected as the driver profile to be used and may also automatically prefer in the corresponding future situations. The profile suggestion may for example also include a brief description or characterization of the automatically recognized situation or type of situation or of the recognized maneuver. Overall, the driver is thus beneficially able to improve the adaptation or individualization of the driver assistance system with greater granularity.

In particular, a neural network of the driver assistance system may learn a driver's behavior concerning switching between different predefined driving profiles from environmental data, vehicle data, driver information and operator actions and then, in corresponding situations, suggest to the driver a change to a specific driving profile that is automatically determined on the basis of learned behavior.

In some embodiments, the respective driver is identified automatically, and a personal profile is created for each different identified driver. The personal profile contains the individual adaptations of the driver assistance system initiated by the respective driver. The adjustments are initiated by confirming queries by the driver. After the driver assistance system has been adapted in each case and the respective personal profile has been updated accordingly, this is automatically transmitted to a server device external to the vehicle via a data connection, in particular a wireless data connection. After the driver assistance system or the motor vehicle has been started, the updated personal profile for the driver identified in each case is automatically called up by the server device via the data connection and is used by the driver assistance system of the motor vehicle. In other words, by storing or temporarily storing the individual personal profile in the external server device, driver related cross-vehicle personalization or individualization is made possible. In other words, the driver's personal profile can thus be transmitted between a number of motor vehicles via the external server device, so that the driver, regardless of which motor vehicle he is using, may always find a driving assistance system that is adapted to his individual preferences. The server device external to the vehicle thus serves as a backend and may, for example, be or comprise a cloud server.

In addition to the method according to the first aspect, a second exemplary aspect relates to a driver assistance system for a motor vehicle, which has a data processing device with an interface for receiving data signals or situation data that characterize a current situation and a user interface. The driver assistance system according to the present aspect is set up to execute or carry out at least one variant or embodiment of the method according to the first aspect. For this purpose, the driver assistance system has a memory device with a program code representing or coding the method and executable by means of the data processing device. For this purpose, the data processing device in particular may have a processor device (CPU), a microcontroller or the like. Therefore, the driver assistance system according to the present aspect in particular may be the driver assistance system mentioned in connection with the method according to the first aspect. Accordingly, the user interface of the driver assistance system may also be set up in particular to output the query to the driver of the motor vehicle and to receive the confirmation of the query. In particular, the driver assistance system may be set up, that is to say, be designed to be connected via the interface to a vehicle bus system of the motor vehicle, that is to say to receive bus signals via the interface. Additionally or alternatively, the driver assistance system may comprise sensors for environmental detection, meaning for recording the environmental data mentioned, for recording a state of the motor vehicle, that is for recording the vehicle data mentioned, and/or for recording a state of the driver, that is for recording the driver information mentioned.

Another exemplary aspect relates to a motor vehicle with a sensor system for environmental detection and with a bus system for providing data signals of the sensor system, i.e., situation data, that characterize a current situation to a driver assistance system of the motor vehicle. The driver assistance system of the motor vehicle is therefore a driver assistance system according to the discussion herein connected to the bus system. Accordingly, the motor vehicle according to the present aspect in particular may be the motor vehicle mentioned in connection with the method according to the first aspect and the driver assistance system according to the second aspect.

In some embodiments, the motor vehicle, in particular its driver assistance system, is set up for manual change or changeability of an association between predetermined driving maneuvers and the multiple predetermined driving profiles by the driver via a user interface. In particular, the motor vehicle or the driver assistance system may also be set up to detect driving maneuvers, for example based on sensor and/or control unit data, of the motor vehicle. Such an individually adaptable assignment beneficially allows the behavior of the driver assistance system to be better individualized, that is to say it can be adapted to the respective driver and his preferences. Due to the possibility of changing or adapting the assignment via the user interface, this individualization or adaptation may in particular be implemented or preset faster and more reliably than solely on the basis of teaching the deviations and the corresponding automatic, that is to say self-reliant adaptation of the driver assistance system. For example, the driver assistance system or the user interface can have an additional menu that enables the driver to decide for himself which driving profile he would like to use for which driving maneuver. For example, the driver may determine whether the ECO, comfort or sport driving profile should be used when a country road trip is detected.

The present discussion also provides further embodiments of the driver assistance system and the motor vehicle, which embodiments have features as already described in connection with the further embodiments of the method according to the first aspect and vice versa. For this reason, the corresponding embodiments are not described redundantly here again for all aspects of the invention.

The embodiments explained below are further exemplary embodiments of the invention. In the embodiments, the described components of the embodiments each represent individual features that are to be considered independently of one another, i.e., as separate embodiments, together as discussed, and in other combinations than the ones shown. Furthermore, the described embodiments may also be supplemented by further features that have already been described in the preceding.

In the FIGS., elements with the same function are each provided with the same reference symbols.

FIG. 1 shows a schematic sectional side view of a motor vehicle 1 which is driven by a driver 2. The motor vehicle 1 has a sensor system 3 at least for the detection of the surroundings, that is to say for the detection of the surroundings of the motor vehicle 1. Likewise, the sensor system 3 can detect a state or an operating characteristic of the motor vehicle 1, for example characterized by one or more parameter values, and a state of the driver 2. For this purpose, the sensor system 3 can comprise several different sensors, in particular at least one camera. Motor vehicle 1 also has a driver assistance system 4 for selecting a driving profile to be used for motor vehicle 1. The driver assistance system 4 comprises a memory 5 in which, among other things, several different predefined driving profiles are stored. The different driving profiles can comprise different settings for several functional parts or systems of motor vehicle 1, in the present case for example for a vehicle device 6. The vehicle device 6 can be or comprise, for example, a control unit, an engine, a brake system, a transmission, a chassis, another assistance system and/or the like of the motor vehicle 1. In the present case, the sensors 3, the driver assistance system 4 and the vehicle device 6 are connected to one another by a bus system 7 of the motor vehicle 1. Data, data signals, control commands and the like can be transmitted or exchanged via the bus system 7.

In the present case, the driver assistance system 4 is connected to a user interface 8, via which outputs are made to the driver 2 and inputs from the driver 2 can be received. In addition, the driver assistance system 4 has a communication module 9 for communication, in particular for bidirectional data exchange, with an external server device 10, which is also shown schematically here.

Figure 2:
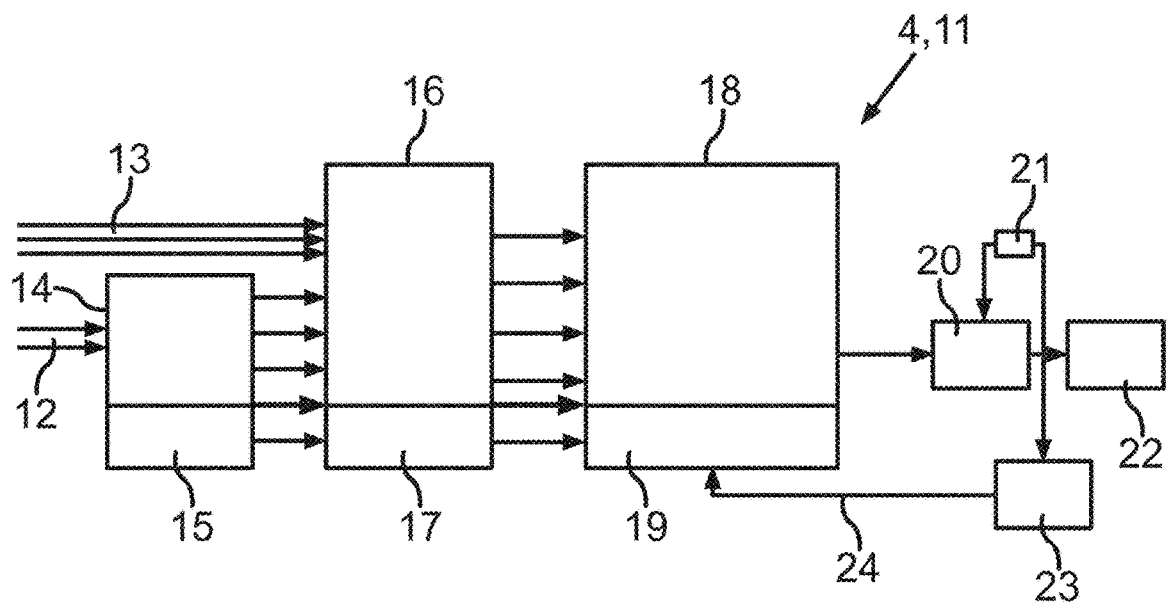
FIG. 2 shows a diagram for illustrating embodiments of a method and driver assistance system for selecting a driving profile to be used and for adapting the driver assistance system.
Figure 3:
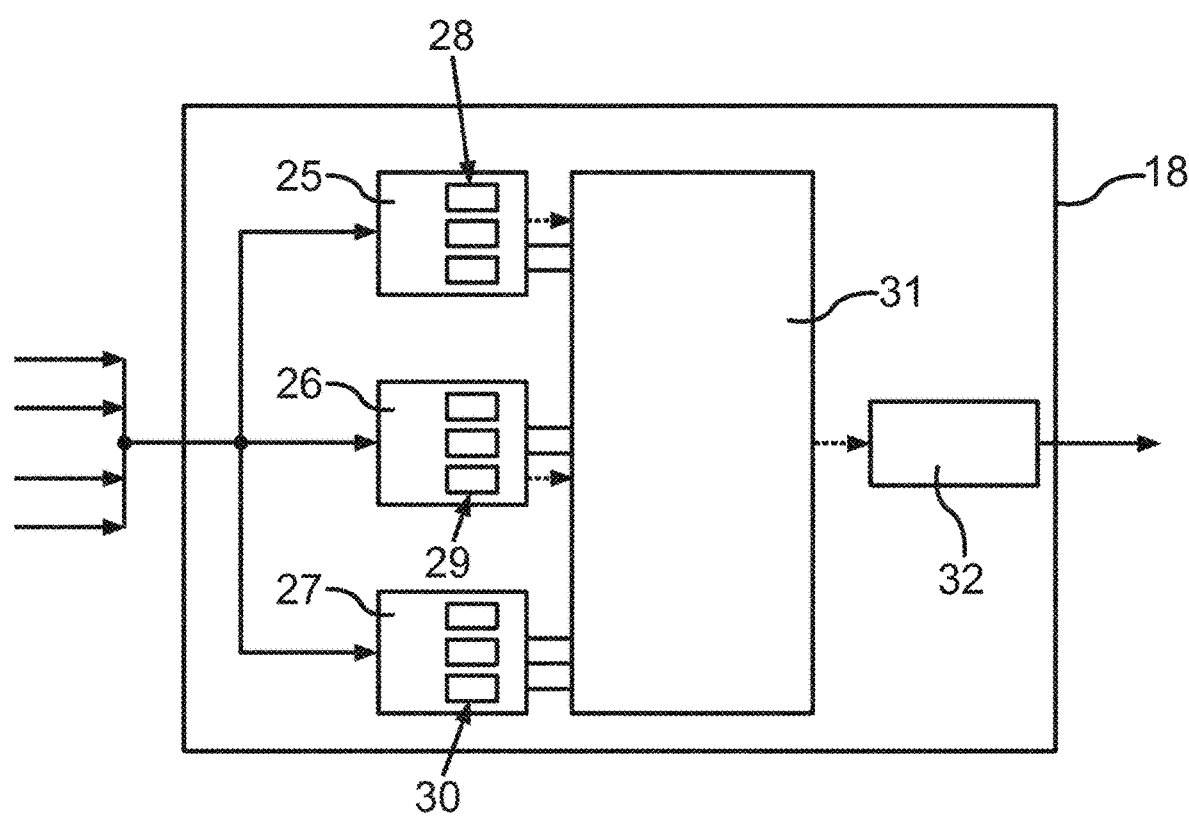
FIG. 3 shows an exemplary diagram to illustrate the determination of the driving profile to be used as part of the diagram from FIG. 2.

FIG. 2 shows a diagram 11 of a method for selecting a driving profile to be used or the driver assistance system 4 or its mode of operation. Diagram 11 will be explained below with reference to FIG. 1 and FIG. 3. FIG. 3 shows part of the diagram 11 in a more detailed schematic representation.

In principle, the driver 2 can manually select between the various predefined driving profiles via the operating or user interface 8, for example via a haptic operating element or a touch display operating element of an infotainment system of the motor vehicle 1. In the present case, however, there is also an additional option for offering of an automatic and dynamic selection of a situation-dependent driving profile by the driver assistance system 4. For this purpose, an additional adaptive driving profile is introduced or provided, wherein when it is selected or used the driver assistance system 4 automatically switches between the other predetermined driving profiles. The switchover takes place in dependence on situation data characterizing a current situation, that is, for example, the current driving situation, the environment, for example the road condition and the weather, a driver type and/or a driving style of driver 2 or the like. As a result, the driver 2 can be relieved and, at the same time, his driving experience can beneficially be intensified or improved.

The sensor system 3 provides environmental data 12 and vehicle data 13 describing the state or one or more properties of the motor vehicle 1 to the driver assistance system 4 via the bus system 7. The environmental data 12 arrive at a preparation 14, where granularization also takes place. The vehicle data 13 and the processed environmental data 12 are then read in by an algorithm of the driver assistance system 4 for a pre-processing 16. The pre-processing 16 may include filtering, data fusion, debouncing, and the like, for example. Which environmental data 12 and which vehicle data 13 are read in and processed can be predefined. Likewise, the environmental data 12 and/or the vehicle data 13 can be selected and/or processed and, as the case may be, be preprocessed, for example depending on the current situation or for example in dependence on a current driving maneuver by the motor vehicle 1 and, as the case may be, by the driver 2. The environmental data 12 and the vehicle data 13 can be collectively referred to as the situation data. These situation data can include, for example, a position of a pedal of the motor vehicle 1 as well as road-specific data, for example of automatic traffic sign recognition, vehicle position data, that is, a position of the motor vehicle, a type or class of a road currently being traveled, and the like, and driver information relating to or describing the driver 2, for example with regard to driver agility or a driver's tiredness status 2. In the present case, the sensor system 3 comprises at least one camera, so that the situation data comprise camera data 15. In the present case, the camera data 15 are provided as input data to a first neural network 17. The first neural network 17 can beneficially process and recognize complex combinations of vehicle bus signals provided via the bus system 7, in particular some or all of the situation data. The first neural network 17 can thus process the camera data 15, possibly in combination with some or all of the other situation data, in particular for—at least partially or provisionally—recognizing or characterizing the current situation. The first neural network 17 in particular may be appropriately trained in order to characterize the surroundings on the basis of the camera data 15, for example to determine a type of road and/or a quality or quality of the road.

Output data provided by the pre-processing 16 and the first neural network 17 are then made available to a driving profile selection 18 and a second neural network 19. The driving profile selection 18 comprises a maneuver recognition based on the data provided, thus parameter-controlled, that is to say a recognition or determination of the driving maneuver currently being carried out. In this context, a maneuver or driving maneuver represents a combination of several vehicle bus signals or situation data, which together define or describe a predefined or predefined driving situation. The driving situation—or situation for short—can be described, for example, by a combination of a static aspect, such as a country road trip, a dynamic aspect, for example an overtaking maneuver, location information, for example a stay of the motor vehicle 1 in the area of a town with a reduced speed limit, and one driver description or information.

In the present case, the driving profile selection 18 further comprises a maneuver prioritization, a profile assignment between driving maneuvers and driving profiles and a driver typing.

By means of the second neural network 19, a type of driver 2 can be identified and assigned. For this purpose, it can be considered or evaluated which driving maneuvers or other operating actions the driver 2 carries out in which (driving) situation. Indirect driver typing using only the situation data and/or other vehicle bus signals by means of predefined rules have considerable blurring and maneuver dependency. One difficulty here is to distinguish whether driver behavior 2 in a situation is due to the generally applicable driving style or driver type of driver 2 or solely to the respective situation. Likewise, reproducibility that can be experienced by the customer can be reduced, since the motor vehicle 1 can behave differently depending on the driver type identified or determined during a maneuver, thus during a situation. Corresponding error rates can beneficially be reduced by using the second neural network 19.

The vehicle data 13 in particular include an operating action performed by the driver 2, for example a manual selection or activation of one of the predefined driving profiles. The second neural network 19 can use the operating actions performed by the driver 2, in particular under consideration of the other situation data, like the environmental data 12, the vehicle data 13, the driver information, etc., to learn a behavior of the driver 2, in particular a manual switching behavior between different driving profiles. The second neural network 19 thus learns the behavior or driving behavior of the driver 2.

In FIG. 3, a comfort driving profile 25, an ECO driving profile 26 and a sport driving profile 27 are shown schematically and by way of example as a part of the driving profile selection 18. Several maneuvers 28 are assigned to the comfort driving profile 25. Several maneuvers 29 are assigned to the ECO driving profile 26. Several maneuvers 30 are assigned to the sport driving profile 27. Since several maneuvers can be recognized simultaneously or overlapping one another, and different candidates for a driving profile to be used for the current situation can result from this as well as from other parts of the processed situation data, a prioritization 31 is also provided as part of the profile selection 18. The different driving maneuvers 28, 29, 30, driving profiles 25, 26, 27 and profile candidates are prioritized or combined via the prioritization 31. As a result, one of the predetermined driving profiles 25, 26, 27 is then selected as the driving profile 32 to be used. An assignment algorithm used here can be coupled with driver personalization. Personal settings or specifications of driver 2 can therefore be considered. For example, a selection of a driving profile 25, 26, 27 that does not match the driver type or driving style intended for driver 2 can be prevented or limited. For example, a sporty driver would be offered reduced availability of the Eco profile 26 or vice versa. Likewise, a maneuver assignment between the predefined driving profiles 25, 26, 27 and the maneuvers 28, 29, 30 that can be adapted by the driver 2 can be taken into account for optimum customization of the driving profile selection 18 and thus the driving experience.

As part of the driving profile selection 18, a personal profile of the driver 2 can also be taken into account, which can be uploaded to the external server device 10 and called up automatically by the latter. The driver 2 can therefore always get back his or her individualized or personalized, especially learned, settings and adjustments—in particular regardless of whether he uses the motor vehicle 1 or another vehicle.

A control matrix can be specified for the driving profile selection 18. The data and information available in the motor vehicle 1 can then be processed by the control matrix in a known, reproducible and deterministic manner, for example in order to recognize the current driving maneuver and/or ultimately to selectively select the driving profile 32 to be used. The most suitable of the predefined driving profiles 25, 26, 27 for the individual driver 2 can be selected via the driving situation and driving style recognition.

The maneuvers 28, 29, 30 have an assigned priority in order to be able to automatically make a clear decision about the profile selection 18 when several of the maneuvers 28, 29, 30 are recognized at the same time. Each of the maneuvers 28, 29, 30 is assigned a target profile, i.e. one of the driving profiles 25, 26, 27, so that unless the same or the highest-priority maneuver 28, 29, 30 or driving profile 25, 26, 27 is active, a corresponding profile selection or profile change request is sent to an automatic driving profile coordinator as part of the driving profile selection 18.

Within or as part of the control matrix, a parameterization, for example of limit values or threshold values, can be specified, which specifies the respective priority or prioritization 31 of the maneuvers 28, 29, 30 and the maneuver-driving profile assignment between the predetermined driving profiles 25, 26, 27 and affect maneuvers 28, 29, 30. This parameterization or the limit or threshold values can be modified via a corresponding adaptation of a control unit data record of the driver assistance system 4.

After the driving profile 32 to be used has been determined or selected, possibly taking into account a weighting, there is a comparison or comparison 20 of the selected driving profile 32 to be used with a current driving profile 21 used up to that point. The driving profile 32 to be used differs from the current driving profile 21 used there, i.e. if a corresponding deviation between the driving profile 32 to be used and the current driving profile 21 previously used was recognized, an automatic switchover 22 to the driving profile 32 to be used takes place. The driving profile 32 to be used corresponds to that of driver profile 2 desired in the current situation or is at least interpreted accordingly.

The perception of the profile switchover, like the switchover 22, for the driver 2 can be realized in various ways. For example, in the form of a visualization of the automatic profile changeover via a permanent indication or display of the currently used driving profile in an instrument cluster of the motor vehicle 1. The automatic switchover 22 of the current driving profile 21 to the selected driving profile 32 to be used can thus be displayed in the instrument cluster of the motor vehicle 1. The active driving profile 25, 26, 27 can always be displayed. Likewise, however, for example when using the corresponding functionality of the automatic profile selection and the automatic switching 22, it can be permanently displayed that the adaptive driving profile is used. Additionally or alternatively, the switchover 22, that is to say an automatic change of the driving profile, can be displayed, for example as a pop-up message in the instrument cluster. In addition, depending on the automatically selected driving profile 25, 26, 27—depending on the availability of the corresponding functionality in the motor vehicle 1 or the corresponding data via the bus system 7—for example an ambient lighting, a pedal characteristic, a damper characteristic and/or the like can be switched, adjusted or adjusted. This also advantageously makes it possible to perceive the profile switchover or the driving profile 25, 26, 27 currently being used—be it purely visually and/or by changing the driving behavior of the motor vehicle 1.

In addition, a query 23 is output to the driver 2, with which it is queried whether the detected deviation between the driving profile 32 to be used and the current driving profile 21 used up to that point should be learned by the driver assistance system 4 for the current situation or type of situation. The query 23 can be output to the driver 2 for each detected deviation or, for example, only when a certain condition is met. For example, query 23 can only be output to driver 2 if the deviation is recognized in recurring situations. In addition, the query 23 can include the automatically selected driving profile 32 to be used as a profile proposal, which the driver 2 must then confirm. If the driver 2 confirms the query 23, the driver assistance system is automatically adapted 24 to the current situation in accordance with the driver profile 32 that is currently desired by the driver, i.e. the driving profile 32 to be used, in at least one parameter influencing the driving profile selection 18 to the effect that this deviation occurs when the driver is automatically selected driving profile 32 to be used in future situations that correspond to the current situation is taken into account.

There is not only an intelligent, situation-dependent selection and switching of the driving profile for motor vehicle 1, but driver feedback is also obtained, if necessary, so that the driver assistance system learns a personal profile for driver 2 over its lifetime. As a result, a clear customer added value can be offered for the driver 2 and a personalization of the driver assistance system 4 and a driving experience of the driver 2 can be achieved.

The selection of the driving profile 32 to be used and the corresponding switchover 22 can be particularly advantageous when the motor vehicle 1 is an electric vehicle, since this increases the range of the motor vehicle 1 compared to an increase in battery capacity and thus a cost-neutral contribution to reducing the so-called range anxiety can be realized.

The solution presented here offers—at least by the automatic profile selection or when using the automatic profile selection based on predefined rules—a dynamic, but reproducible, automatic profile changeover based on fixed criteria. The criteria for profile switching are based on a defined, parameter-controlled maneuver detection. The maneuver detection can take place based on, possibly preprocessed, vehicle sensor data and/or route or map data. The maneuver detection can take place via threshold queries of physical signal values as well as links of logic conditions, the limits and hysteresis behavior of which can be adjusted by parameters. In connection with the detection of the driver type or driving style, a driver-specific profile or behavior for the driver assistance system 4 is learned by obtaining driver feedback using machine learning or artificial intelligence.

For example, a zone with a limited pace of 30 can be identified on the basis of route data and the economical eco driving profile 26 can be selected on the basis thereof, which sets an economical driving style. In the case of an acceleration request or overtaking process recognized by kickdown, i.e. an operating action by the driver 2, a boost power available in the (electric) drive of the motor vehicle 1 is then provided and a sporty suspension and drive setting, that is to say the sport driving profile 27, is selected in order to simplify and accelerate the dynamic process, i.e. the current maneuver 28, 29, 30. In the event of repeated actions by driver 2, query 23 asks whether he would like to drive in this situation in the future, for example, i.e. use sport driving profile 27. If the driver 2 confirms this, the algorithm of the driver assistance system 4 learns this and in the future automatically sets this setting, that is to say the sport driving profile 27, to the driver 2.

Overall, the examples described show how an individualized automatic driving profile selection can be made possible.

LIST OF REFERENCE NUMERALS

1 Motor Vehicle
2 Driver
3 Sensor System
4 Driver Assistance System
5 Memory
6 Vehicle Device
7 Bus System
8 User Interface
9 Communication Module
10 External Server Device
11 Diagram
12 Environmental Data
13 Vehicle Data
14 Preparation
15 Camera Data
16 Pre-Processing
17 First Neural Network
18 Driving Profile Selection
19 Second neural network
20 Comparison (current driving profile against selected driving profile)
21 Current Driving Profile
22 Switchover
23 Query
24 Adaptation
25 Comfort Driving Profile
26 ECO Driving Profile
27 Spot Driving Profile

What is claimed is:

1. A method for selecting a driving profile to be used for a motor vehicle, in which the driving profile to be used is selected automatically and depending on a situation from several predetermined driving profiles by a driver assistance system of the motor vehicle, wherein each of said several predetermined driving profiles determines at least one operating characteristic of the motor vehicle, wherein using the driver assistance system:

recognizing, on the basis of at least one operating action of the motor vehicle carried out by a driver of the motor vehicle, a deviation between the driving profile currently desired by the driver and the one of the several predetermined driving profiles;

outputting, after detection of the deviation, a query to the driver as to whether the deviation for the current situation is to be taught by the driver assistance system; and adapting, after confirmation of the query, the driver assistance system for the current situation in accordance with the driving profile currently desired by the driver in at least one parameter influencing the selection of the driving profile to be used, such that the deviation in the automatic selection of the driving profile to be used is taken into account in future situations that correspond to the current situation; wherein a current driving maneuver is automatically recognized by evaluating situation data that characterizes a current driving situation and in the case of several driving maneuvers recognized at the same time, each of which having assigned one of the predefined driving profiles, the driver assistance system selects one of the predetermined driving profiles to be used depending on a predetermined prioritization of the driving maneuvers.

2. The method of claim 1, wherein a manual selection of one of the several predefined driving profiles is evaluated as the operating action performed by the driver.

3. The method of claim 2, wherein the operating action performed by the driver is a driving maneuver carried out by the driver, which is automatically recognized and evaluated on the basis of current values of predetermined parameters.

4. The method of claim 2, wherein the driver assistance system for the situation-dependent selection of one of the several predetermined driving profiles comprises a basic circuit based on predetermined rules as a fallback mechanism and a learning circuit for adapting the driver assistance system, wherein predetermined types of data signals received via a vehicle bus system are processed by the basic circuit for selecting the driving profile by a predetermined rule matrix, and the learning circuit processes the operating action and situation data characterizing a current driving situation using a machine learning method, in particular using at least one neural network.

5. The method of claim 2, wherein the driver assistance system for the situation-dependent selection of one of the several predetermined driving profiles comprises a basic circuit based on predetermined rules as a fallback mechanism and a learning circuit for adapting the driver assistance system, wherein predetermined types of data signals received via a vehicle bus system are processed by the basic circuit for selecting the driving profile by a predetermined rule matrix, and the learning circuit processes the operating action and situation data characterizing a current driving situation using a machine learning method, in particular using at least one neural network.

6. The method of claim 2, wherein a current driving maneuver is automatically recognized by evaluating situation data that characterizes a current driving situation and in the case of several driving maneuvers recognized at the same time, each of which having assigned in a predetermined manner one of the predefined driving profiles, the driver assistance system selects the one of the predetermined driving profiles to be used depending on a predetermined prioritization of the driving maneuvers.

7. The method of claim 1, wherein the operating action performed by the driver is a driving maneuver carried out by the driver which is automatically recognized and evaluated on the basis of current values of predetermined parameters.

8. The method of claim 7, wherein the driver assistance system for the situation-dependent selection of one of the several predetermined driving profiles comprises a basic circuit based on predetermined rules as a fallback mechanism and a learning circuit for adapting the driver assistance system, wherein predetermined types of data signals received via a vehicle bus system are processed by the basic circuit for selecting the driving profile by a predetermined rule matrix, and the learning circuit processes the operating action and situation data characterizing a current driving situation using a machine learning method, in particular using at least one neural network.

9. The method of claim 7, wherein a current driving maneuver is automatically recognized by evaluating situation data that characterizes a current driving situation and in the case of several driving maneuvers recognized at the same time, each of which having assigned in a predetermined manner one of the predefined driving profiles, the driver assistance system selects the one of the predetermined driving profiles to be used depending on a predetermined prioritization of the driving maneuvers.

10. The method of claim 1, wherein the driver assistance system for the situation-dependent selection of one of the several predetermined driving profiles comprises a basic circuit based on predetermined rules as a fallback mechanism and a learning circuit for adapting the driver assistance system, wherein
predetermined types of data signals received via a vehicle bus system are processed by the basic circuit for selecting the driving profile by a predetermined rule matrix; and
the learning circuit processes the operating action and situation data characterizing a current driving situation using a machine learning method, in particular using at least one neural network.

11. The method of claim 1, wherein the driver assistance system determines a profile candidate for the driving profile to be used on the basis of several different data sources, and that the driver assistance system selects the driving profile to be used from these multiple profile candidates as a function of a predetermined prioritization of the predetermined driving profiles.

12. The method of claim 1, wherein the query is only output to the driver when the same deviation has been detected in several situations corresponding to the current situation.

13. The method of claim 1, wherein as part of the current situation, an associated spatial position of the motor vehicle at which the deviation occurred is automatically recorded and, upon first confirmation, the driver assistance system is first adapted only for the detected position and only when the deviation has been recognized several times for different situations at different spatial positions and the corresponding queries have been confirmed, the driver assistance system is adjusted accordingly for all future similar situations regardless of position.

14. The method of claim 1, wherein the driver assistance system automatically
determines a driver type of the driver and assigns it to the driver;
from the plurality of predetermined driving profiles at least one driving profile that does not match the particular driver type is determined; and
the automatic selection of the driving profile that does not match the specific driver type is prevented or restricted.

15. The method of claim 1, wherein the driver assistance system outputs, as part of the query or after confirming the query, a profile proposal automatically determined by the driver assistance system for the driving profile to be used in the current situation or in future situations corresponding to the current situation to the driver and only adapts the driver assistance system after confirming the profile proposal, such that in future situations, which correspond to the current situation, automatically one of the several specified driving profiles is selected, which corresponds to the confirmed profile proposal.

16. The method of claim 1, wherein
the respective driver is identified automatically;
for each different identified driver, a personal profile is created which contains the individual adjustments to the driver assistance system initiated by the respective driver;
after the adaptation of the driver assistance system and a corresponding update of the respective personal profile, the respective personal profile is automatically transmitted to a server device external to the vehicle via a, in particular wireless, data connection; and
after the driver assistance system has been started, the updated personal profile for the driver identified in each case is automatically loaded from the server device via the data connection and is used by the driver assistance system of the respective motor vehicle.

17. A driver assistance system for a motor vehicle, which driver assistance system comprises: a data processing device with an interface for receiving data signals provided by the motor vehicle that characterize a current situations;
a user interface; and
a storage device with a program code that when executed by the data processing device provides:
recognizing, on the basis of at least one operating action of the motor vehicle carried out by a driver of the motor vehicle, a deviation between the driving profile currently desired by the driver and the one of the several predetermined driving profiles;
outputting, after detection of the deviation, a query to the driver as to whether the deviation for the current situation is to be taught by the driver assistance system; and
adapting, after confirmation of the query, the driver assistance system for the current situation in accordance with the driving profile currently desired by the driver in at least one parameter influencing the selection of the driving profile to be used, such that the deviation in the automatic selection of the driving profile to be used is taken into account in future situations that correspond to the current situation; wherein
a current driving maneuver is automatically recognized by evaluating situation data that characterizes a current driving situation and in the case of several driving maneuvers recognized at the same time, each of which having assigned one of the predefined driving profiles, the driver assistance system selects one of the predetermined driving profiles to be used depending on a predetermined prioritization of the driving maneuvers.

18. A motor vehicle with a sensor system for environmental detection and with a bus system for providing data signals of the sensor system characterizing a current situation to a driver assistance system the motor vehicle, wherein the driver assistance system of the motor vehicle is connected to the bus system and comprises:
a data processing device with an interface for receiving data signals provided by the motor vehicle that characterize a current situation;
a user interface; and
a storage device with a program code that when executed by the data processing device provides:
recognizing, on the basis of at least one operating action of the motor vehicle carried out by a driver of the motor vehicle, a deviation between the driving profile currently desired by the driver and the one of the several predetermined driving profiles;
outputting, after detection of the deviation, a query to the driver as to whether the deviation for the current situation is to be taught by the driver assistance system; and adapting, after confirmation of the query, the driver assistance system for the current situation in accordance with the driving profile currently desired by the driver in at least one parameter influencing the selection of the driving profile to be used, such that the deviation in the automatic selection of the driving profile to be used is taken into account in future situations that correspond to the current situation; wherein a current driving maneuver is automatically recognized by evaluating situation data that characterizes a current driving situation and in the case of several driving maneuvers recognized at the same time, each of which having assigned one of the predefined driving profiles, the driver assistance system selects one of the predetermined driving profiles to be used depending on a predetermined prioritization of the driving maneuvers.

19. The motor vehicle of claim 18, wherein the motor vehicle, in particular its driver assistance system, is set up for a manual change of an assignment between predetermined driving maneuvers and the plurality of predetermined driving profiles by the driver via a user interface.

* * * * *